United States Patent [19]
Johnson et al.

[11] Patent Number: 5,171,793
[45] Date of Patent: Dec. 15, 1992

[54] HYDROGENATED RESINS, ADHESIVE FORMULATIONS AND PROCESS FOR PRODUCTION OF RESINS

[75] Inventors: Carlton B. Johnson; Steve G. Hentges, both of Baton Rouge, La.; Serge Maroie, Veauville les Baons Yvetot, France; Ronald J. Litz, Baton Rouge, La.

[73] Assignee: Exxon Chemical Patents Inc., Linden, N.J.

[21] Appl. No.: 483,471

[22] Filed: Feb. 22, 1990

[51] Int. Cl.$^5$ ................................................ C08F 8/04
[52] U.S. Cl. .......................... 525/332.1; 525/332.8; 525/332.9; 525/338; 525/339
[58] Field of Search ................ 525/332.1, 332.8, 332.9

[56] References Cited

U.S. PATENT DOCUMENTS

| | | |
|---|---|---|
| 3,926,878 | 12/1975 | Shimizu et al. .................. 525/222 |
| 3,927,144 | 12/1975 | Hayashi et al. |
| 4,315,842 | 2/1982 | Tsuchiya et al. |
| 4,446,180 | 5/1984 | Schwab |
| 4,650,829 | 3/1987 | Bossaert et al. |

FOREIGN PATENT DOCUMENTS

| | | |
|---|---|---|
| 149909 | 1/1988 | European Pat. Off. |
| 260001 | 3/1988 | European Pat. Off. |
| 345124 | 12/1989 | European Pat. Off. |
| 2345014 | 3/1975 | Fed. Rep. of Germany |
| 218106 | 1/1985 | German Democratic Rep. |
| 52-140591 | 11/1977 | Japan |
| 52-144039 | 12/1977 | Japan |
| 62-187778 | 8/1978 | Japan |
| 55-104306 | 8/1980 | Japan |
| 57-012012 | 1/1982 | Japan |
| 58-119897 | 7/1983 | Japan |
| 62-000506 | 1/1987 | Japan |
| 62-017051 | 1/1987 | Japan |
| 62-022876 | 1/1987 | Japan |
| 62-054744 | 3/1987 | Japan |
| 63-128048 | 5/1988 | Japan |
| 55065221 | 5/1988 | Japan |
| 8803538 | 5/1988 | PCT Int'l Appl. |
| 1377989 | 12/1974 | United Kingdom |
| 1413013 | 11/1975 | United Kingdom |
| 1447419 | 8/1976 | United Kingdom |

Primary Examiner—Bernard Lipman
Attorney, Agent, or Firm—T. Dean Simmons

[57] ABSTRACT

A thermally polymerized hydrogenated hydrocarbon resin and a novel process for hydrogenating a hydrocarbon resin. The resin is a copolymer of a feed which is a mixture of styrene and indene and derivatives thereof and cyclodiene monomers and dimers and optionally acyclic dienes. The process for hydrogenation of hydrocarbon resins is a process in which the resins are hydrogenated in the presence of an olefinic diluent which increases the hydrogenation reaction temperature to improve hydrogenation efficiency. The resin is useful in block copolymer and ethylene-unsaturated ester copolymer adhesive systems.

11 Claims, No Drawings

HYDROGENATED RESINS, ADHESIVE FORMULATIONS AND PROCESS FOR PRODUCTION OF RESINS

BACKGROUND OF THE INVENTION

The present invention relates to new improved petroleum resins and their production. In particular, the invention relates to petroleum resins suitable as tackifiers for block copolymer based hot melt adhesives and pressure sensitive adhesives, and ethylene-unsaturated ester copolymer based hot melt adhesives. The present invention also relates to a new process for hydrogenating petroleum resins.

Adhesives play an important role in everyone's daily activities and are used in many different forms such as tape, means to close packages or secure items, bandages, envelopes, notepads, diaper tabs, or any one of many other products in common usage. The key performance requirements for adhesives are that they should have suitable cohesive and adhesive properties at end use conditions and during application to substrates while being aesthetically pleasing to consumers. Usually these adhesives are prepared from a mixture of tackifier resins and polymers.

Block copolymers made from styrene and a diolefin are widely used in the production of adhesives. Typical block copolymers are styrene/isoprene/styrene (SIS), styrene/butadiene/styrene (SBS), hydrogenated styrene/butadiene/styrene (SEBS) and the like. While various block copolymers may be used, SBS and SIS copolymers are found to be particularly useful in the present invention. These copolymers are typically blended with tackifying resins and oil in order to form adhesives.

Ethylene-unsaturated ester copolymers are also widely used in the adhesives industry. These copolymers include the group consisting of ethylene copolymerized with an unsaturated ester which contains both an ester group and a carbon-carbon double bond. While various ethylene-unsaturated ester copolymers may be used, ethylene-vinyl acetate copolymers are found to be particularly useful.

The use of SBS block copolymers has proved particularly troublesome to the Adhesives Industry in terms of identifying a suitable tackifier resin. It has been known in preparing adhesives using SIS copolymers that aliphatic tackifier resins may be used with success. Unfortunately, the aliphatic resins, while meeting the requirements for lower color adhesives, do not have adequate compatibility with SBS copolymers to form an acceptable adhesive.

It has been found that the desired adhesive properties are not present with aliphatic tackifier resins in SBS systems because of the higher midblock solubility parameter component of SBS copolymers versus SIS copolymers. While aliphatic tackifier resins, with relatively low solubility parameters, are compatible with the midblock of SIS copolymers, they exhibit limited compatibility with the higher solubility parameter midblock of SBS copolymers. This problem is also compounded by the use of oil in many formulations. If a higher aromatic level tackifier resin is used, a more compatible blend is formed with the SBS midblock, particularly in the presence of oils.

The introduction of aromaticity into the tackifier resin also results in a softer adhesive system which is advantageous in many uses. This is due to the interaction of the resin with the hard styrene domains of SBS or SIS, which results in a reduced plateau modulus. This principle is particularly important for block copolymers, either SBS or SIS, which have relatively high levels of styrene content and are thus relatively hard.

Attempts to make use of the positive compatibility characteristics associated with the introduction of higher levels of aromatic compounds into tackifier resins have generally caused an unacceptably high color level for usage in many modern adhesives (British Patent 1,377,989). Previous efforts to overcome the difficulties associated with introduction of aromatic compounds in tackifier resins have been directed towards polymerizing mixtures of aliphatic and aromatic compounds. British Patent 1,447,419 describes a hot melt pressure sensitive adhesive composition based on block polymers, including SBS, and a tackifier obtained by catalytically polymerizing and hydrogenating a mixture of aromatic and aliphatic compounds. However, problems arise from the use of such mixtures. While aromatic and aliphatic compounds are easily polymerized in the presence of a metal halide catalyst such as anhydrous aluminum chloride, the use of such catalyst has been found to have deleterious effects in the production of tackifier resins.

Because of the high color characteristics associated with the introduction of aromatic compounds into tackifier resins, the resins must be hydrogenated to reduce their color values in order to be used in many adhesive systems. The use of metal halide catalysts in the polymerization step leads to the incorporation of halide groups in the resin. These halide groups are very difficult to remove and if not removed from the resin, prior to the necessary hydrogenation process, will become bound to the hydrogenation catalyst during hydrogenation. The effect of halides is to "poison" the catalyst which results in decreased hydrogenation activity and increased cracking of the tackifier resin. The results of such catalyst "poisoning" may include poor color and stability of the hydrogenated resin as well as a degraded molecular weight.

EP-A-260001 discloses a hydrogenated resin made by catalytic polymerization and hydrogenation of a mixture of aromatic, aliphatic and terpene compounds. Examples show the use of such resins in SBS block copolymer based adhesives. The terpene component does not originate in the cracking of petroleum feed streams and is more costly. EP-A-149909 discloses a resin for pressure sensitive adhesive compositions containing hydrogenated butadiene/styrene block copolymer. A feed containing cyclopentadiene and derivatives is thermally polymerized and hydrogenated. The application states that the feed may contain aromatics.

Accordingly, it is the object of the present invention to provide halide free, low color petroleum resins, thermally polymerized from a feed which is comprised of a vinyl aromatic component, a cyclodiene component and optionally an acyclic diene component. It is a further object of the present invention to provide a novel hydrogenation process to obtain low color levels of thermally polymerized petroleum resins. It is a further object of the present invention to provide novel block copolymer based hot melt and pressure sensitive adhesive systems. Yet a further object of the present invention is to provide hot melt adhesive systems based on ethylene-unsaturated ester copolymers.

SUMMARY OF THE INVENTION

It has been discovered that a light colored, thermally polymerized resin can be produced from a feedstock which is comprised of a vinyl aromatic component as the predominant component, a cyclodiene component, and optionally an acyclic diene component. The vinyl aromatic component consists of a stream comprising styrene, alkyl substituted derivatives of styrene, indene and alkyl substituted derivatives of indene. The cyclodiene component is comprised of monomers, dimers and codimers of cyclopentadiene and alkyl substituted derivatives of cyclopentadiene. Optionally, a $C_4$-$C_5$ acyclic diene component may be introduced. The acyclic diene stream is comprised of butadiene and alkyl substituted derivatives of butadiene.

In a separate embodiment of the invention, the cyclodiene component is the predominant component of the feedstock with cyclodiene component ranging up to 1000 parts by weight to 100 parts by weight of the vinyl aromatic component.

Following polymerization, the resins are hydrogenated by a novel process in the presence of an olefinic diluent which increases the hydrogenation reactor temperature and improves the efficiency of the hydrogenation process.

The resultant resins have near water white to water white colors and superior heat stabilities. Typical resins according to the present invention have the following properties: weight average molecular weight (Mw) by GPC of about 300-1000, number average molecular weight (Mn) of about 100-500, a (Mw)/(Mn) ratio of about 2.1, and a ring and ball softening point range of about 70°-200° C., preferably 70°-130° C. Further, the resins have a Saybolt color of 23-30 and 1-20% aromatic hydrogens measured by $^1$H-NMR.

It is also an object of this invention to provide hot melt compositions incorporating this novel resin in formulations comprising 100 parts ethylene unsaturated ester copolymer, and 40 to 400 parts resin.

It is a further object of this invention to provide pressure sensitive and hot melt adhesive compositions incorporating this novel resin in formulations comprising 100 parts block polymer, containing blocks with repeat units derived from vinyl aromatics and dienes, and 40 to 400 parts resin according to this invention.

DETAILED DESCRIPTION OF THE INVENTION

As set forth above, the petroleum resins according to the present invention are obtained by a process which comprises thermally polymerizing a feedstock which contains a vinyl aromatic stream, a lesser amount of a cyclodiene stream and optionally a $C_4$-$C_5$ acyclic diene stream. In a separate embodiment, the cyclodiene component of the feedstock is the predominant component of the feedstock with up to 1000 parts cyclodiene component to 100 parts vinyl aromatic component.

A typical vinyl aromatic stream used according to the present invention has a composition of 7 wt % styrene; 30 wt % alkyl substituted derivatives of styrene, 13 wt % indene, 9 wt % alkyl substituted derivatives of indene and 41 wt % non-reactive aromatic components. The vinyl aromatic stream is obtained by steam cracking petroleum refinery streams and separating the fraction boiling in the range of 135° to 220° C. by fractional distillation.

A useful cyclodiene stream according to the present invention comprises monomers, dimers and codimers of cyclopentadiene, and alkyl substituted derivatives of cyclopentadiene. This component of the feedstock is obtained by steam cracking petroleum refinery streams, separating a $C_5$-$C_6$ fraction boiling in the range of 30°-80° C., heat soaking to dimerize and codimerize the cyclopentadiene and alkyl substituted cyclopentadienes and distilling to remove unreacted $C_5$-$C_6$ components.

Although the cyclodiene component of the feedstock used in the following examples contains mixtures of these various monomers, dimers, and codimers of cyclopentadiene and alkyl substituted derivatives of cyclopentadiene, it is understood that single component cyclodienes such as pure dicyclopentadiene may also be used.

A useful acyclic diene stream according to the present invention consists of butadiene and alkyl substituted butadienes in pure form or admixed with $C_4$-$C_6$ monoolefins and paraffins. This component of the feedstock is obtained by stream cracking petroleum refinery streams and recovering the acyclic dienes in pure form or mixed with $C_4$-$C_6$ mono-olefins and paraffins by fractional distillation.

Two components of the feedstock, the vinyl aromatic stream and the cyclodiene stream are combined in a mixture having about 100 parts vinyl aromatic components and 10 to 1000 parts cyclodiene component. The most preferred mixture of vinyl aromatic and cyclodiene components is 100 parts vinyl aromatic component to 66 parts cyclodiene component. The feed mixture may also include a non-reactive polymerization diluent, such as toluene. The feed mixture may optionally contain up to 100 parts of an acyclic diene component. The resin feedstock mixture may be thermally polymerized at a temperature between 160° and 320° C., preferably from 250°-290° C., for a period of 10 to 500 minutes, preferably 60-180 minutes. The resin solution that results from the thermal polymerization is stripped of solvent and unreacted monomers by heating to a temperature of from 150°-300° C., with or without the injection of steam. The resultant resin exhibits the following properties: softening point from 80°-200° C., weight average molecular weight (Mw) by GPC from 300-1000, number average molecular weight (Mn) from 100-500 and dark color.

The resin is then hydrogenated to a level where the resultant resin contains about 1% to 20% aromatic hydrogens as measured by $^1$H-NMR. The aromatic functionality may be untouched by the hydrogenation process or be hydrogenated by 99% relative to its non-hydrogenated state. The novel hydrogenation step is carried out by hydrogenating a mixture containing 100 parts resin from the above described thermal polymerization, 100 to 300 parts solvent diluent, and 5 to 100 parts olefinic diluent, in a hydrogenation reactor with a peak temperature of 100° to 350° C., preferably 280°-320° C., with a volumetric throughput of 0.5 to 2.0 VVH, preferably from 0.75 to 1.5 VVH. The most preferred range of components for the hydrogenation feed are 100 parts resin, 100-200 parts solvent diluent, and 15-60 parts olefinic diluent. Following hydrogenation, the resin can be stripped to softening points ranging from 70°-200° C., preferably 70°-130° C. The resultant resins exhibit the following properties: weight average molecular weight (Mw) by GPC from 300-1000, number average molecular weight (Mn) from 100-500, a Mw/Mn ratio of about 2.1 and a Saybolt color of 23-30.

The presence of the olefinic diluent allows the hydrogenation reactor to achieve a desirable rapid increase in temperature early in the hydrogenation run. The rapid increase in temperature results from the rapid exothermic hydrogenation reaction of converting the olefinic diluent to a paraffin. The amount of olefinic diluent used should be such that the exothermic reaction increases the hydrogenation reactor temperature by 40° to 140° C. Preferably, the temperature increase should be in the range of 80°-110° C. The desired peak temperature in the hydrogenation reactor should be in the range of 280°-320° C. when the olefinic diluent is used in a hydrogenation reactor having an inlet temperature ranging from 180°-240° C. The olefinic diluent may be any olefin, preferably a mono-olefin, having 3 to 20 carbon atoms, preferably 5 to 12 carbon atoms. The solvent diluent may be any saturated hydrocarbon solvent, preferably aliphatic or cycloaliphatic in nature. The solution that results from the hydrogenation process is stripped of solvent and oligomeric material by heating to temperatures of from 150°-350° C., with or without the injection of steam.

The hydrogenation may be achieved in the presence of any of the known catalysts commonly used for hydrogenating petroleum resins. The catalysts which may be used in the hydrogenation step include the Group VIII metals such as nickel, palladium, ruthenium, rhodium, cobalt and platinum, the Group VI metals such as tungsten, chromium and molybdenum, the Group VII metals such as rhenium, manganese and copper. These metals may be used singularly or in a combination of two or more metals, the metallic form or in an activated form and may be used directly or carried on a solid support such as alumina or silica-alumina. A preferred catalyst is one comprising sulfided nickel-tungsten on a gamma-alumina support having a fresh catalyst surface area ranging from 120-300 m$^2$/g and containing from 2-10% by weight nickel and from 10-25% by weight tungsten as described in U.S. Pat. No. 4,629,766 which is incorporated herein by reference. The hydrogenation is carried out with a hydrogen pressure of 20-300 atmospheres, preferably 150-250 atmospheres.

This hydrogenation process is found to be useful to produce petroleum resins being near water white to water white in color with superior heat stability. It has been found that without the use of the olefinic diluent to increase the temperature of the hydrogenation reactor, that resins having color values only as good as 15-25 Saybolt may be obtained. These resins are far from water white and have inferior heat stability.

The olefinic diluent's importance results from the fact that it boots the hydrogenation exotherm and that it provides an exotherm early in the length of the hydrogenation reactor. By providing an early exotherm, the temperature of the reactor is above a critical temperature for a larger portion of the reactor length than without the olefinic diluent. This critical temperature is that temperature which results in the hydrogenation of double bonds and chromophores in the resin molecule. Therefore the resin is more likely to undergo hydrogenation rather than further thermal polymerization since the rise in temperature which results from hydrogenation of the olefinic diluent is abrupt. Further polymerization in the hydrogenation unit is not desirable since this could result in coating and deactivation of the hydrogenation catalyst. Also, since a greater percentage of the hydrogenation reactor is above the critical temperature and actually contributes to hydrogenation, the hydrogenation efficiency of the unit is improved.

One type of adhesive composition according to the invention is pressure sensitive and hot melt adhesives wherein the elastomeric polymer is a block copolymer. The block copolymers may be of the AB type. Thus, when an end block A is joined to an elastomer block B, an A-B block copolymer unit is formed which unit can be coupled by various techniques or with various coupling agents to provide a structure such as A-B-A, which may be in reality be two A-B blocks joined together in a tail/tail arrangement. By a similar technique a radial block copolymer can be formed having the formula (A-B)$_n$X wherein X is the hub or central, polyfunctional coupling agent and n is a number greater than 2. Using the coupling agent technique, the functionality of X determines the number of A-B branches. By way of example, each block A has an average molecular weight between 1,000 and 60,000 and each block B has an average molecular weight between 5,000 and 450,000. The total molecular weight of the block copolymer may be in excess of 100,000 or 200,000 e.g. 300,000. Many different block copolymers are useful in the present invention. Particularly useful block copolymers are those in which (A) is polystyrene and (B) is a polydiene. Most commonly, the polydienes are polyisoprene (SIS) and polybutadiene (SBS). Other useful block copolymers, according to the present invention are the hydrogenated block copolymers such as styrene/ethylene/butene/styrene copolymers (SEBS) from hydrogenation of SBS.

The block polymer adhesive compositions according to the present invention may vary considerably, depending on the characteristics desired in the adhesive systems. A useful range of block polymer and resin composition has been to 100 parts block copolymers to 40-400 parts resin. A preferred compositions is 100 parts block polymer and 50-200 parts resin. The composition of the invention may also include other ingredients as used in conventional practice such as antioxidants, plasticizers, oils, and other tackifiers.

Another adhesive composition according to the present invention is a hot melt adhesive in which the polymeric component is an ethylene-unsaturated ester copolymer. Suitable ethylene-unsaturated ester copolymers are those consisting of ethylene copolymerized with unsaturated esters having an ester group and a carbon-carbon double bond. Such unsaturated esters include vinyl acetate and esters of acrylic or methacrylic acid with alcohols having 2-10 carbon atoms.

The ethylene-unsaturated ester copolymer composition according to the present invention may vary considerably, depending upon the characteristics desired in the adhesive system. The useful range of components is found to be 100 parts polymer component to 40-400 parts resin component. A preferred composition is 100 parts polymer component and 50-200 parts resin. The composition of the invention may also include other ingredients as used in conventional practice such as waxes, antioxidants, plasticizers, fillers, pigments and other tackifiers.

While the above discussion and following examples are directed to production of a tackifier resin, it is understood that the novel hydrogenation process set forth herein may be used to hydrogenate hydrocarbon resins for use in many other applications.

The present invention therefore provides a thermally polymerized, hydrogenated hydrocarbon tackifier resin which is a copolymer of a feedstock comprised of a mixture of a vinyl aromatic stream containing styrene, alkyl substituted derivatives of styrene, indene and alkyl substituted derivatives of indene; a cyclodiene stream comprised of monomers, dimers and codimers of cyclopentadiene and alkyl substituted derivatives of cyclopentadiene; and optionally a $C_4$–$C_5$ acyclic diene stream.

In particular, the present invention provides a thermally polymerized, hydrogenated hydrocarbon tackifier resin which is a copolymer of a feedstock which is comprised of 100 parts of a vinyl aromatic stream containing styrene and indene and alkyl substituted derivatives thereof; 10 to 1000 parts of a cyclodiene stream comprised of monomers, dimers and codimers of cyclopentadiene and alkyl substituted derivatives of cyclopentadiene; and optionally 0 to 100 parts of a $C_4$–$C_5$ acyclic diene stream.

It is a further object of this invention to provide a process for production of a hydrocarbon resin in which the resin is hydrogenated in the presence of an olefinic diluent to yield a hydrocarbon resin having superior color characteristics. In particular, the present invention provides a process for the production of a hydrocarbon resin in which 100 parts of the resin is hydrogenated in the presence of 5 to 100 parts olefinic diluent.

Two further objects of this invention are to provide block copolymer and ethylene-unsaturated ester copolymer adhesive systems incorporating the resins of this invention.

The present invention can be further illustrated by the following examples, although it is understood that these examples are included merely for the purposes of illustration and are not intended to limit the scope of the invention unless otherwise specifically indicated.

EXAMPLE 1

The vinyl aromatic stream and the cyclodiene streams shown in Table 1 were mixed to form a feedstock containing 100 parts vinyl aromatic stream and 67 parts cyclodiene stream. The resultant feedstock was blanketed with nitrogen and thermally polymerized for two hours at a temperature of 270° C. Following polymerization, the resin solution was stripped with steam at 250° C. to recover a dark colored resin in 56% yield with properties as shown in Table II.

This resin was then mixed with a solvent diluent, (Varsol) and an olefinic diluent in a mixture containing 100 parts resin; 167 parts solvent diluent; and 19 parts $C_5$ mono-olefinic diluent. The mixture was fed into a hydrogenation reactor having an inlet temperature of 220° C. and a pressure of 200 atmospheres hydrogen with a liquid volumetric throughput of 1.0 VVH and a gas volumetric throughput of 200 VVH. The exothermic hydrogenation of the olefinic diluent and resin raised the hydrogenation reactor to a peak temperature of 305° C. The resultant hydrogenated resin solution was then stripped with steam at 250° C. This sample by hydrogenated resin, having a softening point of 102° C. and a Saybolt color of 28.9, also exhibited the properties shown in Table II. Adhesive performance data for the hydrogenated resin in an SBS based formulation are shown in Table III.

EXAMPLE 2

The vinyl aromatic and cyclodiene streams shown in Table I were mixed to form a feedstock containing 100 parts vinyl aromatic stream and 34 parts cyclodiene stream. This feedstock was polymerized and hydrogenated with the conditions indicated in Table II. The hydrogenated resin had a softening point of 103° C. and a Saybolt color of 23.4. Other properties of the nonhydrogenated and hydrogenated resins are shown in Table II. Adhesive performance data for the hydrogenated resin are shown in Table III.

EXAMPLE 3

The vinyl aromatic and cyclodiene streams shown in Table I were mixed with an additional non-reactive component, toluene, to give a feedstock containing 100 parts of the vinyl aromatic stream, 300 parts of the cyclodiene stream and 60 parts of toluene. This feedstock was polymerized and hydrogenated with the conditions indicated in Table II. The hydrogenated resin had a softening point of 105° C. and a Saybolt color of 29.7. Other properties of the nonhydrogenated and hydrogenated resins are shown in Table II. Adhesive performance data for the hydrogenated resin in an SBS based formulation are shown in Table III.

EXAMPLE 4

The vinyl aromatic and cyclodiene streams shown in Table I were mixed with an additional $C_5$ acyclic diene stream, the composition of which is shown in Table IV, to give a feedstock containing 100 parts vinyl aromatic stream, 67 parts cyclodiene stream and 19 parts acyclic diene stream. This feedstock was polymerized and hydrogenated with the conditions indicated in Table II. The hydrogenated resin had a softening point of 93° C. and a Saybolt color of 29.0. Other properties of the nonhydrogenated and hydrogenated resins are shown in Table III. Adhesive performance data for the hydrogenated resin in an SBS based formulation are shown in Table III.

EXAMPLE 5

The vinyl aromatic an cyclodiene streams shown in Table 1 were blended as in Example 1, then polymerized and hydrogenated under the conditions given in Table II. The properties of the resulting resin are also shown in Table II. Adhesive performance data for this sample in EVA based hot melt packaging and assembly applications are shown in Table V.

EXAMPLE 6

(Comparative Example)

The vinyl aromatic and cyclodiene streams shown in Table I were blended as in Example 1, then polymerized as in Example 5 and hydrogenated as shown in Table II. The resulting stripped resin was mixed with solvent diluent only with no olefinic diluent. The mixture was fed into a hydrogenation reactor having an inlet temperature of 220° C., a pressure of 200 atmospheres hydrogen and a liquid volumetric throughput of 1.0 VVH with a gas throughput of 200 VVH. The exothermic hydrogenation of the resin with no olefinic diluent raised the hydrogenation reactor to a peak temperature of 267° C. The resultant resin was then stripped with steam at 250° C. This sample of hydrogenated resin, having a softening point of 109° C. and a Saybolt color of 14.9, also exhibited the properties shown in Table II.

EXAMPLE 7

The vinyl aromatic and cyclodiene streams shown in Table I were blended to form a feedstock containing 100 parts vinyl aromatic stream and 67 parts cyclodiene stream. This feedstock was polymerized and hydrogenated as in Example 1. The polymerization and hydrogenation conditions as well as neat resin properties are shown in Table II. Adhesive performance data for the hydrogenated resin in a high styrene content SIS based formulation are shown in Table VI.

EXAMPLES 8-13

Examples 8-13 provide further examples of resins according to the present invention. Compositions of the cyclodiene streams and the vinyl aromatic stream which were polymerized are set forth in Table VII. The feedstreams were comprised of the cyclodiene and aromatic streams in the ratios set forth in Table VIII and were thermally polymerized for 2½ hours at a temperature from 265° to 275° C. Toluene was added to control viscosity.

The resins produced according to Examples 8-13 were subjected to flash distillation and steam stripping to remove unreacted substances and low molecular weight oligomers. The resins had softening points of from 72° to 107° C., an aromaticity of 6 to 14% aromatic hydrogen determined by proton NMR and Gardner colors of 10 to 16. The resin properties are set forth in more detail in Table VIII.

The stripped resins from Examples 8-13 were then redissolved in Exxsol D40 solvent with olefinic diluent (Table IX) such that the hydrogenation feed contains 30 weight percent resin, 15 to 20 weight percent olefinic diluent and 50 to 55 weight percent solvent diluent (Exxsol D40). The resulting hydrogenated solution was steam stripped at 250° C. These hydrogenated resins, having softening points from 84°-104° C., also exhibited the properties shown in Table VIII.

TABLE I

|  | Percent by Weight |
|---|---|
| Vinyl Aromatic Stream Components |  |
| Styrene | 7 |
| Alkyl Derivatives of Styrene | 30 |
| Indene | 13 |
| Alkyl Derivatives of Indene | 9 |
| Non Reactive Components | 41 |
| Total | 100 |
| Cyclodiene Stream Components |  |
| Dicyclopentadiene | 77 |
| Cyclopentadiene/$C_5$ acyclic diene codimer | 15 |
| Methyl cyclopentadiene/$C_5$ acyclic diene codimer | 4 |
| Cyclopentadiene | 2 |
| Cyclopentadiene/$C_4$ acyclic diene codimer | 1 |
| Other | 1 |
| Total | 100 |

TABLE II

|  | EXAMPLE NO. | | | | | | |
|---|---|---|---|---|---|---|---|
|  | 1 | 2 | 3 | 4 | 5 | 6 | 7 |
| Polymerization |  |  |  |  |  |  |  |
| Feed: |  |  |  |  |  |  |  |
| Aromatics[1] (parts) | 100 | 100 | 100 | 100 | 100 | 100 | 100 |
| Cyclodienes[1] (parts) | 67 | 34 | 300 | 67 | 67 | 67 | 67 |
| Toluene (parts) | — | — | 60 | — | — | — | — |
| Acyclic dienes (parts) | — | — | — | 19 | — | — | — |
| Conditions: |  |  |  |  |  |  |  |
| Temperature (°C.) | 270 | 275 | 270 | 270 | 275 | 270 | 270 |
| Time (Minutes) | 120 | 150 | 90 | 120 | 150 | 180 | 120 |
| Yield (wt %) | 56 | 55 | 54 | 50 | 55 | 60 | 56 |
| Ring and Ball Softening Point (°C.) | 107 | 99 | 126 | 90 | 100 | 90 | 107 |
| Aromaticity[2] | 14 | 17 | 6 | 15 | 16 | 14 | 14 |
| GPC Molecular Weight |  |  |  |  |  |  |  |
| Mw | 510 | 512 | 533 | 442 | 484 | 582 | 510 |
| Mw/Mn | 2.5 | 2.4 | 2.8 | 2.3 | 2.6 | 2.9 | 2.5 |
| Mz | 1242 | 1244 | 1408 | 1072 | 1239 | 1244 | 1242 |
| Gardner Color | 16+ | 18+ | 13+ | 15+ | 16+ | 16+ | 16+ |
| Hydrogenation |  |  |  |  |  |  |  |
| Feed: |  |  |  |  |  |  |  |
| Resin (parts) | 100 | 100 | 100 | 100 | 100 | 100 | 100 |
| Olefinic Diluent (parts) | 19 | 83 | 83 | 29 | 77 | — | 19 |
| Non Olefinic Diluent[3] (parts) |  | 167 | 150 | 150 | 157 | 233 | — |
| Conditions: |  |  |  |  |  |  |  |
| Inlet Temperature (°C.) | 220 | 200 | 205 | 190 | 230 | 220 | 220 |
| Peak Temperature (°C.) | 305 | 309 | 310 | 305 | 306 | 267 | 305 |
| Liquid Volumetric Throughput (VVH) | 1.0 | 1.0 | 1.0 | 1.0 | 1.0 | 1.0 | 1.0 |
| Gas Volumetric Throughput (VVH) | 200 | 200 | 200 | 200 | 200 | 200 | 200 |
| Yield (wt %) | 32 | 24 | 30 | 28 | 27 | 28 | 32 |
| Ring and Ball Softening Point (°C.) | 102 | 103 | 105 | 93 | 103 | 109 | 102 |
| Aromaticity[2] | 10 | 12 | 3.0 | 9 | 8 | 11 | 10 |
| GPC Molecular Weight |  |  |  |  |  |  |  |
| Mw | 466 | 479 | 423 | 429 | 540 | 578 | 466 |
| Mw/Mn | 2.1 | 1.9 | 2.4 | 1.9 | 2.0 | 2.2 | 2.1 |
| Mz | 1003 | 962 | 960 | 897 | 958 | 1099 | 1003 |
| Glass transition | 53 | 52 | 51 | 44 | 58 | 59 | 53 |

TABLE II-continued

| | EXAMPLE NO. | | | | | | |
|---|---|---|---|---|---|---|---|
| | 1 | 2 | 3 | 4 | 5 | 6 | 7 |
| temperature (°C.)[4] | | | | | | | |
| Saybolt Color | 28.9 | 23.4 | 29.7 | 29.0 | 29.7 | 14.9 | 28.9 |
| Heat Stability[5] (Gardner Color) | 1.5 | 5.4 | <1.0 | 1.3 | <1.0 | 7.4 | 1.5 |

[1] See Table 1
[2] Percent aromatic hydrogens by proton NMR
[3] Varsol
[4] Glass Transition Temperature determined by Differential Scanning Calorimetry
[5] Gardner Color measured after aging resins in air for 5 hours at 177° C.

TABLE III

Resin Adhesive Performance Data in an SBS Based Formulation[1]

| | EXAMPLE NO. | | | |
|---|---|---|---|---|
| | 1 | 2 | 3 | 4 |
| Peel Strength (lbs./in.) | | | | |
| To Stainless Steel | 4.5 | 4.3 | 0.2 | 3.8 |
| To Polyethylene | 3.2 | 3.1 | 0.1 | 2.0 |
| 90° Quick Stick (lbs./in.) To Stainless Steel | 3.9 | 3.3 | 0 | 3.0 |
| Polyken Tack, grams | 715 | 447 | 209 | 1787 |
| Shear Adhesion Failure Temperature[2], (°C.) To Stainless Steel | 63 | 61 | 62 | 63 |
| 178° Holding Power[3] (Hrs) To Stainless Steel | 1.1 | 1.0 | 0.7 | 0.4 |

[1] Adhesive Formulation:
100 parts resin
45 parts Stereon 840A SBS
36 parts Tufflo 6056 oil
2 parts Irganox 1010
[2] 1000 g weight
[3] 2000 g weight

TABLE IV

| C5 Acyclic Diene Stream Components | Percent by Weight |
|---|---|
| trans-Pentadiene-1,3 | 17 |
| cis-Pentadiene-1,3 | 11 |
| Other cyclic and acyclic dienes | 5 |
| Mono-olefins | 28 |
| Paraffins | 39 |
| Total | 100 |

TABLE V

RESIN ADHESIVE PERFORMANCE DATA FOR Example 5 in EVA Based Formulations

| | Formulation[1] A | Formulation[2] B |
|---|---|---|
| Peel Strength (lbs./in.) | | |
| To Aluminum | 2.48 | — |
| To Polyethylene | 5.07 | — |
| Shear Adhesion Failure Temperature (°C.) | 84 | 63 |
| Peel-Fail Temperature (°C.) | 54 | 48 |
| Pop open Temperature (°C.) | 104 | 63 |
| Viscosity (centipoise @ 177° C.) | 5050 | 2300 |
| Molten Color (Gardner) | 1 | 1 |
| Skinning (%)[3] | 0 | 0 |
| Tensile Strength (psi) | — | 600 |

[1] Adhesive Formulation
100 parts Resin
87 parts Excorene UL7750 (ethylene-vinyl acetate copolymer)
50 parts Escomer H101 (wax)
12 parts Kaydol Oil
+ 1 part Irganox 1010
[2] Adhesive Formulation
100 parts Resin
67 parts Escorene UL7750
56 parts Aristowax 165
0.5 part Irganox 1010
0.5 part Mark 33
[3] After heating formulation in air for 96 hours at 350° F.

TABLE VI

Resin Adhesive Performance Data Example 7 in an SIS based Formulation[1]

| Pressure Sensitive Adhesive Test Methods | Example 7 |
|---|---|
| Rolling Ball Tack (cm) | 3.5 |
| 180° Peel Strength (lbs./in.) | |
| To Stainless Steel | 4.1 |
| To Polyethylene | 2.2 |
| 90° Quick Stick (lbs./in.) To Stainless Steel | 3.0 |
| Shear Adhesive Failure Temperature[2] (°C.) To Stainless Steel | 92 |
| Hot Melt Adhesive Test Methods | |
| T-Peel Strength (lbs./in.) | |
| To Aluminum | 2.6 |
| To Polyethylene | 2.8 |
| Shear Adhesive Failure[3] Temperature (°C.) To Aluminum | 89 |

[1] Adhesive Formulation:
100 parts resin
100 parts Sol T 193B
22 parts Kaydol oil
1 part Irganox 1010
[2] 1000 gram weight
[3] 500 gram weight

TABLE VII

| | Percent by Weight |
|---|---|
| Vinyl Aromatic Stream Components | |
| Styrene | 1 |
| Alkyl Derivatives of Styrene | 33 |
| Indene | 19 |
| Alkyl Derivatives of Indene | 2 |
| Non Reactive Components | 45 |
| Total | 100 |

| | A | B |
|---|---|---|
| Cyclodiene Stream Components | | |
| Dicyclopentadiene | 56 | 89 |
| Cyclopentadiene/C5 acyclic diene codimer | 4 | 3 |
| Cyclopentadiene/Methyl Cyclopentadiene codimers | 10 | 6 |
| Non Reaction components | 30 | 2 |
| Total | 100 | 100 |

TABLE VIII

| | Example no. | | | | | |
|---|---|---|---|---|---|---|
| | 8 | 9 | 10 | 11 | 12 | 13 |
| FEED COMPOSITION (a) | | | | | | |
| Cyclodienes A (parts) | — | 100 | — | — | — | — |
| Cyclodienes B (parts) | 100 | — | 100 | 100 | 100 | 100 |
| Aromatics (parts) | 100 | 100 | 100 | 100 | 100 | 100 |
| Toluene (parts) | 50 | 50 | 50 | 50 | 50 | 50 |
| PROCESS CONDITIONS | | | | | | |
| Temperature (deg C.) | 270 | 270 | 265 | 265 | 265 | 265 |
| Time (minutes) | 150 | 150 | 150 | 150 | 150 | 150 |
| RESIN BEFORE HYDROGENATION | | | | | | |
| Ring & Ball Softening point (°C.) | 107 | 72 | 83 | 83 | 83 | 83 |
| Gardner Color | 12 | 12 | 12 | 12 | 12 | 12 |
| Aromaticity[1] | 11 | 12 | 11 | 11 | 11 | 11 |
| Bromine number (g/100 g) | — | — | — | — | — | — |
| RESIN HYDROGENATION | | | | | | |
| Inlet temperature (deg C.) | 226 | 224 | 231 | 223 | 237 | 219 |
| Peak temperature (deg C.) | 299 | 300 | 316 | 304 | 327 | 278 |
| HYDROGENATED RESIN PROPERTIES | | | | | | |
| Resin yield (wt %) | 99 | 72 | 96 | 89 | 86 | 91 |
| Ring & Ball Softening point (°C.) | 101 | 103 | 87 | 101 | 94 | 104 |
| Gardner Color | — | — | — | — | — | 2 |
| Saybolt | 30 | 27 | 30 | 30 | 30 | 23 |
| Aromaticity[1] | 6.0 | 7.7 | 4.1 | 6.0 | 4.0 | 8.9 |
| Bromine number (g/100 g) | 0.257 | 0.506 | 0.058 | 0.157 | 0.071 | — |
| Heat stability (Gardner)[2] | 3.5 | 1 | 1 | 1 | 1 | 5 |

[1] Percent aromatic hydrogens by proton NMR
[2] 5 hours at 175° C.; all samples are inhibited with 0.3 wt % BHT; 1 g resin; non ventilated oven

TABLE IX

| Acyclic Diene Stream Components | Percent by Weight |
|---|---|
| C$_4$ Olefins | 5 |
| C$_5$ Olefins | 21 |
| C$_6$ Olefins | 15 |
| Diolefins | 4 |
| Paraffins | 26 |
| Unknowns | 29 |
| Total | 100 |

What is claimed is:

1. A thermally polymerized hydrogenated hydrocarbon tackifier resin being a copolymer of a feed which is comprised of an aromatic stream comprised of styrene and indene and a stream comprised of cyclodiene monomers and dimers wherein said aromatic stream is the predominant component of the feed.

2. The hydrocarbon resin according to claim 1 wherein said feed is comprised of 100 parts by weight of the aromatic stream and 10 to 90 parts by weight of the cyclodiene stream.

3. The hydrocarbon resin according to claim 1 wherein the feed is comprised of 100 parts by weight of the aromatic stream and 67 parts by weight of the cyclodiene stream.

4. The hydrocarbon resin according to claim 2 wherein the cyclodiene stream comprises dicyclopentadiene, cyclopentadiene and methyl cyclopentadiene.

5. The hydrocarbon resin according to claim 4 wherein said resin has a softening point of 70°–130° C.

6. The hydrocarbon resin according to claim 5 wherein said resin has a molecular weight by GPC (Mw) of 300–1000.

7. The hydrocarbon resin according to any of claims 1–6 wherein said resin has a Saybolt color of from about 23 to about 30.

8. The hydrocarbon resin according to claim 2 wherein said feed is further comprised of a C$_4$–C$_5$ acyclic diene stream.

9. A thermally polymerized hydrogenated hydrocarbon tackifier resin being a copolymer of a feed comprised of:
   an aromatic stream comprised of styrene and indene; and
   a stream comprised of one or more components selected from the group consisting of cyclodiene monomers and dimers and C$_4$–C$_5$ acyclic dienes.

10. The hydrocarbon resin according to claim 9 wherein the feed is comprised of 100 parts by weight of the aromatic stream and 10 to 1000 parts by weight of the cyclodiene stream.

11. The hydrocarbon resin according to claim 9 wherein said feed is comprised of 100 parts by weight of the aromatic stream; 10 to 1000 parts by weight of the cyclodiene stream; and 1 to 100 parts by weight of the C$_4$–C$_5$ acyclic diene stream.

* * * * *